April 17, 1951  F. W. KRAUSE  2,549,489
WHEEL LIFTING DOLLY
Filed Sept. 30, 1947  2 Sheets-Sheet 1

Inventor
Frederick W. Krause
By Clarence A. O'Brien
and Harvey B. Jacobson
Attorneys April 17, 1951  F. W. KRAUSE  2,549,489
WHEEL LIFTING DOLLY
Filed Sept. 30, 1947  2 Sheets-Sheet 2

Inventor
Frederick W. Krause
By *Clarence A. O'Brien and Harvey B. Jacobson*
Attorneys Patented Apr. 17, 1951

2,549,489

UNITED STATES PATENT OFFICE 2,549,489

WHEEL LIFTING DOLLY

Frederick W. Krause, Carmichaels, Pa.

Application September 30, 1947, Serial No. 777,021

5 Claims. (Cl. 214—1)

The present invention relates to new and useful improvements in wheel lifting devices and more particularly to means for mounting the lifting device on a dolly whereupon a wheel, when lifted from the ground, may be transported to a desired position with a minimum of manual effort.

An important object of the present invention is to provide a device of this character for lifting heavy wheels, such as the wheels mounted on the landing gear of airplanes, trucks, or the like, and to provide a lifting device which will easily and quickly lift the wheels from the ground for removal or replacing on the airplane axle.

A further object of the invention is to provide a portable wheel lifting device including front and rear trucks for positioning at the opposite sides of a wheel and providing means for detachably coupling the trucks to each other to facilitate placing thereof against the tire of the wheel.

Another object is to provide a jack mechanism carried by one of the trucks to exert a lifting force on the wheel.

A still further object is to provide a device of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
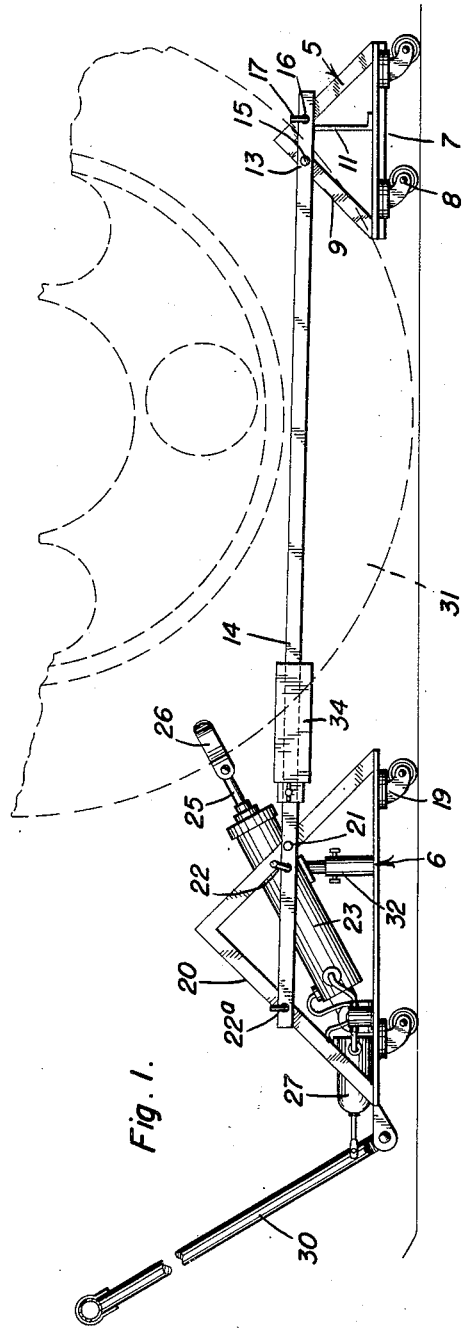
Figure 1 is a side elevational view of the dolly.
Figure 2:
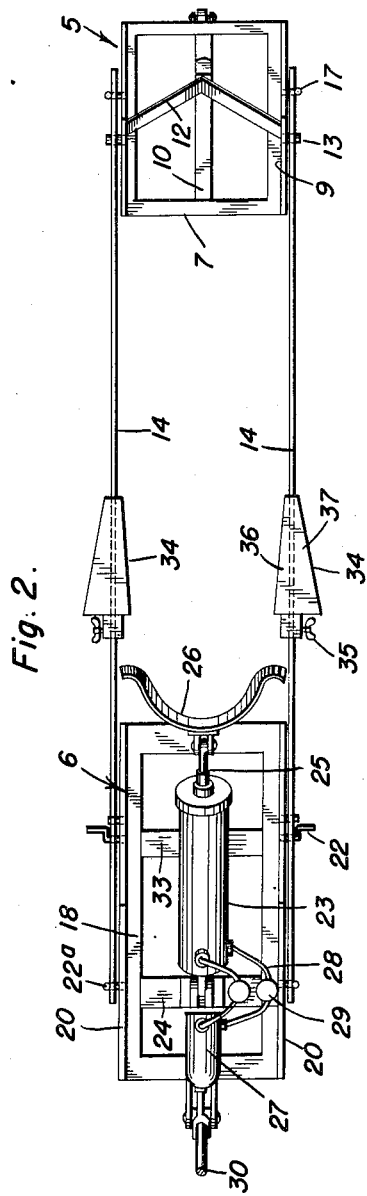
Figure 2 is a top plan view thereof.
Figure 3:
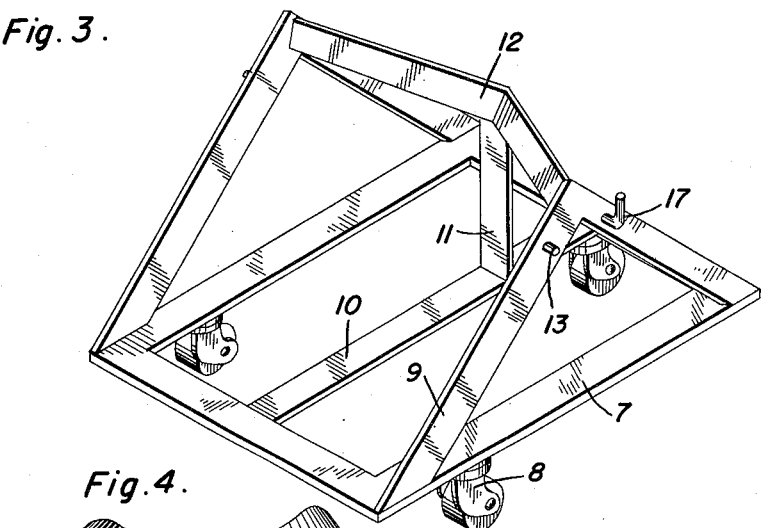
Figure 3 is an enlarged perspective view of the front wheel truck.
Figure 4:
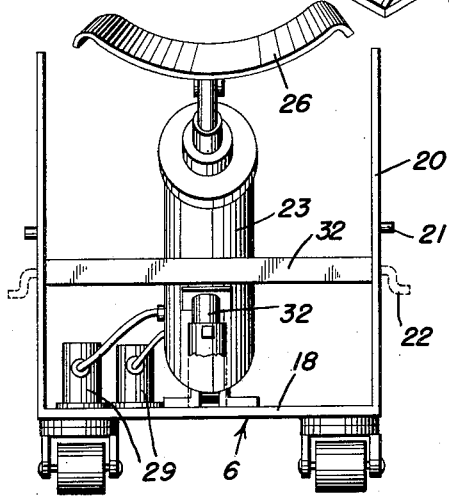
Figure 4 is a front elevational view of the rear wheel truck.
Figure 5:
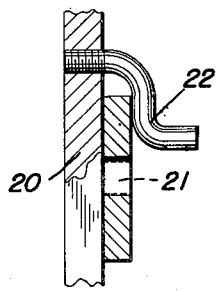
Figure 5 is an enlarged fragmentary sectional view of the locking means for the connecting bar of the trucks.
Figure 6:
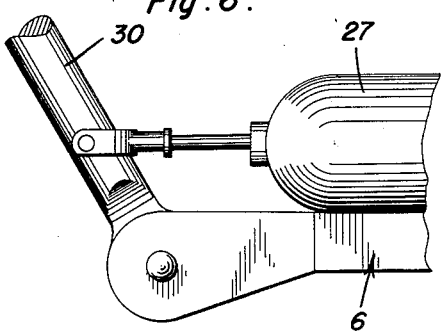
Figure 6 is an enlarged fragmentary side elevational view of the pump for the jack.

Referring now to the drawings in detail, wherein, for the purpose of illustration, I have disclosed a preferred embodiment of the invention, the numeral 5 designates generally the front truck of the lifting device and the numeral 6 designates the rear truck thereof.

The front truck includes a horizontal frame 7 supported on caster or swivel wheels 8, and welded or otherwise suitably secured to the side edges of the frame is a pair of inverted V-shaped supports 9. A longitudinal frame member 10 extends between the front and rear ends of the frame 7 and is welded or otherwise suitably secured thereto. A post 11 rises from the rear portion of the frame member 10 and to the upper end of which is supported the central portion of a horizontally positioned V-shaped saddle 12, the ends of the saddle being inclined forwardly and welded or otherwise suitably secured to the upper ends of the support 9.

Pins 13 project outwardly from the rear legs of the support 9, adjacent the upper portions thereof and on which the front ends of a pair of longitudinally extending connecting bars 14 are supported by means of openings 15 in the bars. The front ends of the bars are also provided with openings 16 for receiving upwardly bent hooks 17 projecting from the sides of the support 9 to thus hold the bar in position on the pins 13.

The rear truck 6 likewise includes a horizontal rectangular frame 18 supported on swivel or caster wheels 19 and suitably secured to the side edges of the frame 18 is a pair of inverted V-shaped supports 20. The supports 20 are also provided with outwardly projecting pins 21 receiving the rear ends of the rods 14 and locking crank handles 22 are carried by the front legs of the supports 20 to lock the rear ends of the rods in position against the supports of the rear truck 6. The rear legs of the supports 20 are further provided with outwardly extending hooks 22a on which the rods 14 are engaged to support the bars horizontally when their front ends are removed from the front trucks. A hydraulic jack cylinder 23 is pivoted at its rear end to a transverse brace 24 carried by the frame 18, the jack cylinder being upwardly inclined in a forward direction and includes a plunger 25 projecting outwardly from the front end of the cylinder and to the outer end of which is pivotally attached a saddle 26.

A pump 27 is mounted on the rear portion of frame 18 and is connected to the cylinder 23 by hose lines 28 having control valves 29 therein to admit fluid under pressure from the pump to the cylinder and to exhaust the fluid therefrom. The pump is operated manually by a handle 30 or may be power operated, if desired.

In the operation of the device, one of the connector bars 14 is removed from the front and rear trucks 5 and 6 and the trucks are then moved into a position at the opposite edges of a wheel 31. The detached bar is then replaced on the pins 13 and 21 of the front and rear trucks and locked in place by the locking cranks 22 so that the tire of the wheel is engaged at its opposite sides by the pair of bars.

The jack 23 is then operated by the pump 27 to exert its pressure on the adjacent edge of the tire by the yoke 26 which lifts the wheel from the ground and holds the wheel in a raised position between the saddle 12 of truck 5 and the yoke 26 of truck 6, whereupon the wheel may be removed from its mounting and hauled to a desired location for repair by the trucks 5 and 6. The connector bars 14 aid in holding the wheel in an upright position.

When the device is not in use, the jack cylinder 23 is supported in an upwardly inclined position by a vertically adjustable rest 32 carried by a cross bar 33 supported between the sides of frame 18 of the rear truck 6.

The tire 31 is held tightly between the bars 14 by wedges 34 slidably mounted on the bars and secured in adjusted position thereon by set screws 35. Each wedge includes a thin face 36 and a relatively thick face 37 having angles of different degrees which may be selectively turned on the bars to take up any clearance between the tire and the bars.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A wheel lift comprising front and rear trucks, one of said trucks having a fixed abutment for one edge of a wheel and the other of said trucks having a pressure operated abutment for an opposite edge of a wheel to rock the wheel in a lifting action against said fixed abutment, and means connecting said trucks to each other, said means comprising a pair of bars connected at their ends to opposite sides of the trucks and positioned closely at opposite sides of the wheel, said bars being removable from the trucks and swingable catches locking the bars to the trucks.

2. A wheel lift comprising front and rear trucks, one of said trucks having a fixed abutment for one edge of a wheel and the other of said trucks having a pressure operated abutment for an opposite edge of a wheel to rock the wheel in a lifting action against said fixed abutment, and means connecting said trucks to each other, said means comprising a pair of bars connected at their ends to opposite sides of the trucks and positioned at opposite sides of the wheel and wedges carried by the bars and engaging the sides of the wheel.

3. A wheel lift comprising front and rear trucks, one of said trucks having a fixed abutment for one edge of a wheel and the other of said trucks having a pressure operated abutment for an opposite edge of a wheel to rock the wheel in a lifting action against said fixed abutment, means connecting said trucks to each other, said means comprising a pair of bars connected at their ends to opposite sides of the trucks and positioned at opposite sides of the wheel, and wedges slidably carried by the bars for movement into and out of wedging engagement with a tire of the wheel.

4. A wheel lift comprising front and rear trucks, one of said trucks having a fixed abutment for one edge of a wheel and the other of said trucks having a pressure operated abutment for an opposite edge of a wheel to rock the wheel in a lifting action against said fixed abutment, and means connecting said trucks to each other, said means comprising a pair of bars connected at their ends to opposite sides of the trucks and positioned at opposite sides of the wheel and wedges carried by the bars and engaging the sides of the wheel, said wedges having double wedge faces of different angles for selectively contacting the wheel.

5. A wheel lift comprising front and rear trucks, means detachably connecting the trucks to each other at opposite edges of a wheel, and a lifting mechanism carried by one of the trucks to exert a lifting force on the wheel, said lifting mechanism including a jack and a vertically adjustable jack rest carried by said one truck to support the jack in an upwardly inclined position.

FREDERICK W. KRAUSE.

REFERENCES CITED

The following references are of record in the file of this patent:

UNITED STATES PATENTS

| Number | Name | Date |
|---|---|---|
| 2,252,534 | Trotter | Aug. 12, 1941 |
| 2,349,251 | Domoj | May 23, 1944 |
| 2,357,633 | Cowgill, Jr. | Sept. 5, 1944 |
| 2,380,415 | Carruthers | July 31, 1945 |
| 2,452,481 | Morehead et al. | Oct. 26, 1948 |

FOREIGN PATENTS

| Number | Country | Date |
|---|---|---|
| 664,920 | Germany | Sept. 13, 1938 |